United States Patent
Lorenz et al.

(10) Patent No.: US 9,451,571 B2
(45) Date of Patent: Sep. 20, 2016

(54) DETERMINING UPLINK AND DOWNLINK DELAYS BETWEEN A BASEBAND UNIT AND A REMOTE RADIO HEAD

(71) Applicant: Alcatel-Lucent USA Inc., Murray Hill, NJ (US)

(72) Inventors: Diana L. Lorenz, Naperville, IL (US); Kenneth Y. Ho, New Providence, NJ (US); Greg A. Martin, Lisle, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 88 days.

(21) Appl. No.: 14/493,184

(22) Filed: Sep. 22, 2014

(65) Prior Publication Data

US 2016/0088581 A1    Mar. 24, 2016

(51) Int. Cl.
*H04W 56/00* (2009.01)
*H04W 24/08* (2009.01)
*H04W 4/02* (2009.01)

(52) U.S. Cl.
CPC ........... *H04W 56/0065* (2013.01); *H04W 4/02* (2013.01); *H04W 24/08* (2013.01)

(58) Field of Classification Search
CPC .. H04W 56/0065; H04W 4/02; H04W 24/08
See application file for complete search history.

(56) References Cited

U.S. PATENT DOCUMENTS

| | | | | |
|---|---|---|---|---|
| 2003/0148774 | A1* | 8/2003 | Naghian | H04W 64/00 455/456.1 |
| 2010/0208603 | A1* | 8/2010 | Ishii | H04B 1/7113 370/252 |
| 2011/0310941 | A1* | 12/2011 | Kenington | H04W 88/085 375/220 |
| 2012/0163299 | A1* | 6/2012 | Chen | H04W 56/004 370/328 |
| 2012/0189074 | A1* | 7/2012 | Jin | H04B 7/024 375/267 |
| 2012/0263220 | A1* | 10/2012 | Li | H04W 56/00 375/224 |
| 2013/0266323 | A1* | 10/2013 | Tan | H04J 3/0682 398/115 |
| 2015/0117861 | A1* | 4/2015 | Ponzini | H04B 10/2575 398/79 |
| 2015/0139100 | A1* | 5/2015 | Grob-Lipski | H04W 72/04 370/329 |

FOREIGN PATENT DOCUMENTS

WO   WO 2013174544 A1 * 11/2013 .......... H04W 88/085

* cited by examiner

*Primary Examiner* — Kashif Siddiqui
(74) *Attorney, Agent, or Firm* — Davidson Sheehan LLP

(57) ABSTRACT

A baseband unit independently determines one or both of an uplink delay or a downlink delay for frames transmitted from the baseband unit to a remote radio head based on a round-trip time between the baseband unit and the remote radio head and times determined at the baseband unit, a downlink node associated with the remote radio head, and an uplink node associated with the remote radio head. The times are determined at different nodes after an interval of frames. The baseband unit then may determine a location of user equipment based on one or both of the uplink delay or downlink delay.

14 Claims, 5 Drawing Sheets

DETERMINING UPLINK AND DOWNLINK DELAYS BETWEEN A BASEBAND UNIT AND A REMOTE RADIO HEAD

BACKGROUND

1. Field of the Disclosure

The present disclosure relates generally to wireless communication systems and, more particularly, to signal delays between a baseband unit and a remote radio head in a wireless communication system.

2. Description of the Related Art

Wireless communication service providers typically are required to provide emergency call services (e.g. the e911 service in the U.S.) that are able to locate user equipment placing an emergency call to within a specified accuracy. For example, U.S. Federal Communication Commission (FCC) requirements specify that an emergency caller's location be determined within an accuracy of at least 50 meter (m) for 67% of calls and an accuracy of at least 150 m for 90% of calls. One technique for establishing the location of user equipment within the coverage area of a wireless communication system is Observed Time Difference Of Arrival (OTDOA), which uses the difference in arrival times of signals transmitted by multiple base stations to a user equipment to estimate the location of the user equipment by multilateration. Implementing OTDOA imposes stringent requirements on phase synchronization, delay measurements, and delay compensation in the base stations. For example, to achieve the FCC-mandated accuracy, transmission times of downlink radio frames from the antenna tip at a remote radio head should be known within 100 nanosecond (ns) accuracy. The end-to-end delay accuracy budget between a baseband unit and a remote radio head of the base station is therefore 100 ns.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The conventional approach to delay measurement and compensation is to measure a round-trip time for timestamps that are sent from the baseband unit to the remote radio head and then returned to the baseband unit. The uplink and downlink delays are assumed to be symmetrical and the delay in each direction is assumed to be equal to half the round-trip time. This approach is sufficiently accurate when the baseband unit and the remote radio head are proximate to each other and interconnected by fiber-optic cables. However, the uplink and downlink delays may differ from each other when there is additional circuitry between the baseband unit and the remote radio head. For example, the baseband unit may not be proximate the remote radio head. Instead, a master device in the baseband unit may communicate with a slave device at the remote radio head over a network. The master device, the network, or the slave device may introduce asymmetric uplink and downlink delays.

The uplink and downlink delays experienced by signals transmitted from a baseband unit to a remote radio head over an intervening network can be independently measured by comparing a round-trip time between the baseband unit and the remote radio head to times measured at a predetermined interval of frames at a downlink node of the baseband unit, a downlink node associated with the remote radio head, and an uplink node associated with the remote radio head. In some embodiments, baseband unit may measure a first transition time when a set of least significant bits of a downlink counter wraps to zero. The baseband unit may also incorporate a value of the downlink counter into a predetermined location within each frame. The slave unit measures a second transition time at its downlink node when the set of least significant bits of the downlink counter in the frame wraps to zero. The slave unit measures a third transition time at its uplink node when the set of least significant bits of the downlink counter in the frame wraps to zero. The downlink delay may be equal to a difference between the second transition time and the first transition time, plus half the difference between the second and third transition times. The uplink delay may be equal to the round-trip time minus a difference between the third transition time and the first transition time, plus half the difference between the second and third transition times.

Figure 1:
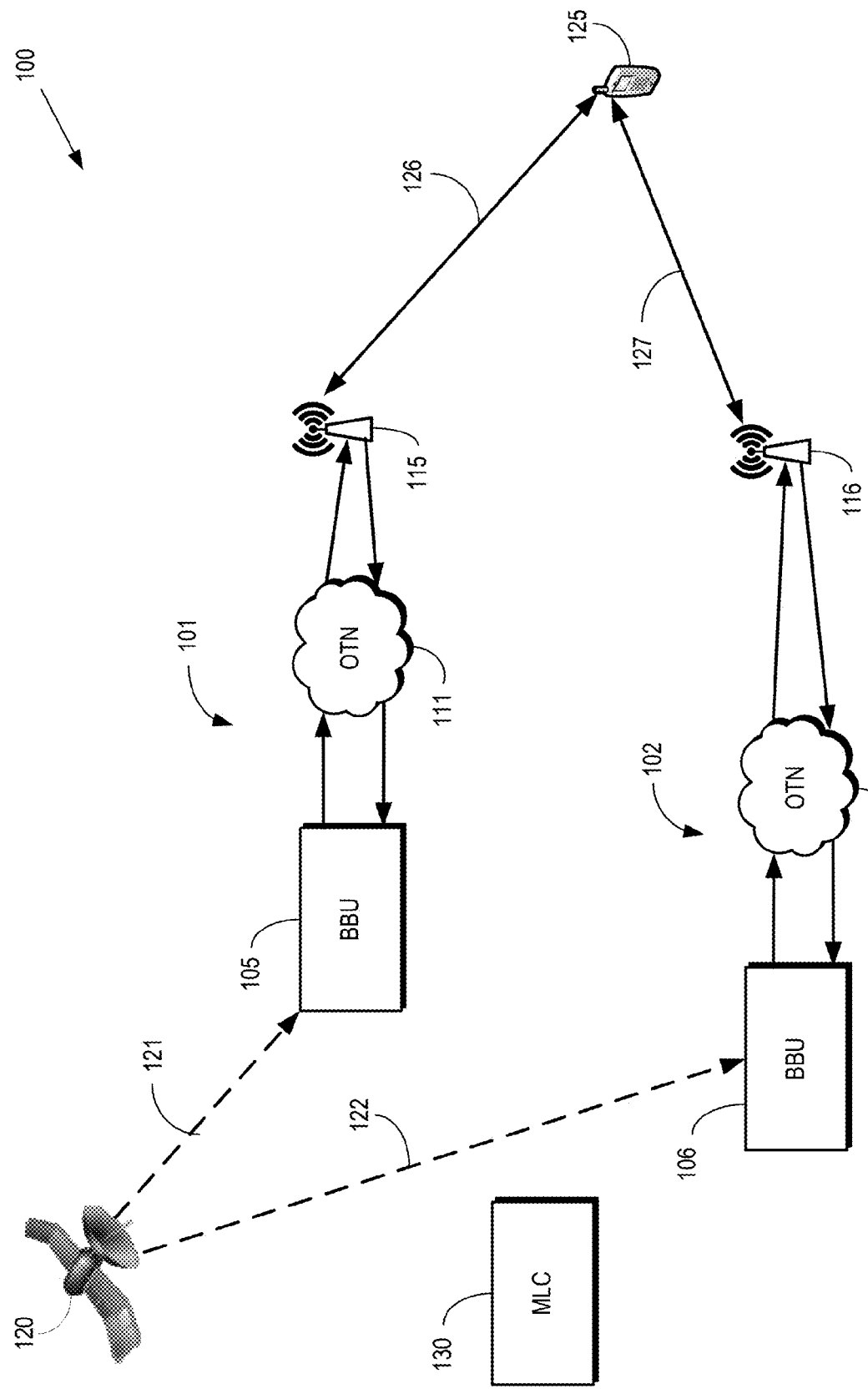
FIG. 1 is a block diagram of a wireless communication system according to some embodiments.

FIG. 1 is a block diagram of a wireless communication system 100 according to some embodiments. The wireless communication system 100 includes a plurality of base stations or eNodeBs 101, 102. Although two eNodeBs 101, 102 are shown in FIG. 1, some embodiments of the wireless communication system 100 may include additional eNodeBs to provide wireless coverage through a larger geographic area. The eNodeBs 101, 102 include baseband units 105, 106 that are connected to remote radio heads 115, 116 by intervening transport networks such as optical transport networks 111, 112. The baseband units 105, 106, remote radio heads 115, 116, and optical transport networks 111, 112 may be synchronized to an external timing reference. Some embodiments of the wireless communication system 100 may therefore include or have access to an external timing reference such as a Global Positioning System (GPS), which is represented in FIG. 1 as a GPS satellite 120 that provides timing reference signals 121, 122 that can be used to synchronize the components of the eNodeBs 101, 102.

The eNodeBs 101, 102 may communicate with one or more user equipment 125 over air interfaces 126, 127. For example, the baseband unit 105 may generate frames including information destined for the user equipment 125. The frames may be transmitted over a downlink (or transmission) path through the optical transport network 111 to the remote radio head 115, as indicated by the rightward pointing arrows. The remote radio head 115 may then transmit the frames over the air interface 126 to the user equipment 125. Some embodiments of the user equipment 125 may also generate frames including information destined for the eNodeB 101. The user equipment 125 may transmit the frames over the air interface 126 to the remote radio head 115, which may then transmit the frames over an uplink (or reception) path through the optical transport network 111 to the baseband unit 105, as indicated by the leftward pointing arrows.

The wireless communication system 100 may provide emergency services to user equipment 125 that are served by the eNodeBs 101, 102 or other eNodeBs. For example, eNodeBs 101, 102 that operate according to the Long Term Evolution-Frequency Division Duplex (LTE-FDD) standards support an e911 application to provide emergency services. The eNodeBs 101, 102 may therefore be required to locate the user equipment 125 placing the emergency call within a specified accuracy. For example, U.S. FCC requirements specify that an emergency caller's location be determined within 50 m accuracy for 67% of calls and 150 m accuracy for 90% of calls. Some embodiments of the wireless communication system 100 may use the Observed Time Difference of Arrival (OTDOA) techniques to determine locations of user equipment 125. For example, the user equipment 125 may measure time differences between synchronized signals transmitted by the eNodeBs 101, 102 and report the measured time differences to a mobile location center (MLC) 130. The MLC 130 may use the measured time differences (perhaps in combination with other time differences measured for other eNodeBs) to estimate the location of the user equipment 125 using multilateration techniques.

The requirements of emergency location services set very tight constraints on phase synchronization, delay measurement, and compensation in the wireless communication system 100. Some embodiments of the wireless communication system 100 may require 100 ns accuracy (1 sigma) in synchronization between downlink radio frames being transmitted from antenna tips at the remote radio heads 115, 116. This 100 ns is the end-to-end delay error budget for all the components of the eNodeBs 101, 102. The delays in the eNodeBs 101, 102 may be estimated by measuring the round trip delay time (RTT) for frames sent from the baseband units 105, 106 to the remote radio heads 115, 116 and returned to the baseband units 105, 106. For example, each frame may include a value of a counter and the baseband units 105, 106 may measure the time required for a frame with a given counter value to make the round-trip. The uplink delay and the downlink delay are assumed to be symmetrical and the delay in each direction is assumed to be equal to RTT/2. However, this approach may not satisfy the constraints on the delay measurement because it does not take into account the asymmetric delays introduced by intervening processing and network elements such as the optical transport networks 111, 112.

Some embodiments of the wireless communication system 100 may therefore independently determine the uplink delay and the downlink delay for signals transmitted from the baseband units 105, 106 to the remote radio heads 115, 116. For example, the baseband unit 105 may measure a round-trip time between the baseband unit 105 and the remote radio head 115. The baseband unit 105 may also measure a time in response to a predetermined number of frames elapsing. Times may also be measured at a downlink node and an uplink node associated with the remote radio head 115 in response to the predetermined number of frames elapsing, e.g., by monitoring a counter value included at a predetermined location in each frame. The interval between successive measurements at the baseband unit 105 and the downlink and uplink nodes associated with the remote radio head 115 is the same. For example, the times may be measured at locations proximate the remote radio head 115 in response to a predetermined set of least significant bits of the counter value wrapping to zero, as discussed herein. Multiple measurements at successive time intervals can be performed and averaged to estimate the average uplink or average downlink delay in the eNodeBs 101, 102.

The time interval between successive measurements of the times at the baseband unit 105 and the uplink and downlink nodes may be set to a relatively large number or large time interval to reduce jitter and other inaccuracies. For example, each frame may have a duration of 10 milliseconds (ms) and a set of least significant bits of the frame counters may be set to 9 or 10 so that 512 or 1024 frames elapse between the time measurements, which correspond to a time interval of approximately 5 seconds or approximately 10 seconds, respectively. In some embodiments, the number of least significant bits in the set of least significant bits can be tuned to different values to vary the number of frames or time interval that elapses between measurements of the transition times. Performing the time measurement at a relatively slow rate may filter out any short-term jitter effect. For example, GPS receivers may introduce short term jitter error that is comparable to the target delay errors of a few nanoseconds, so this error contribution should be removed to achieve the target delay errors. Filtering at a slower rate may not affect the measurements of the uplink delay or downlink delay because the uplink and downlink delays are substantially constant. Consequently, the average of many measurements provides a more accurate indication of the uplink delay or the downlink delay in the eNodeBs 101, 102.

Figure 2:
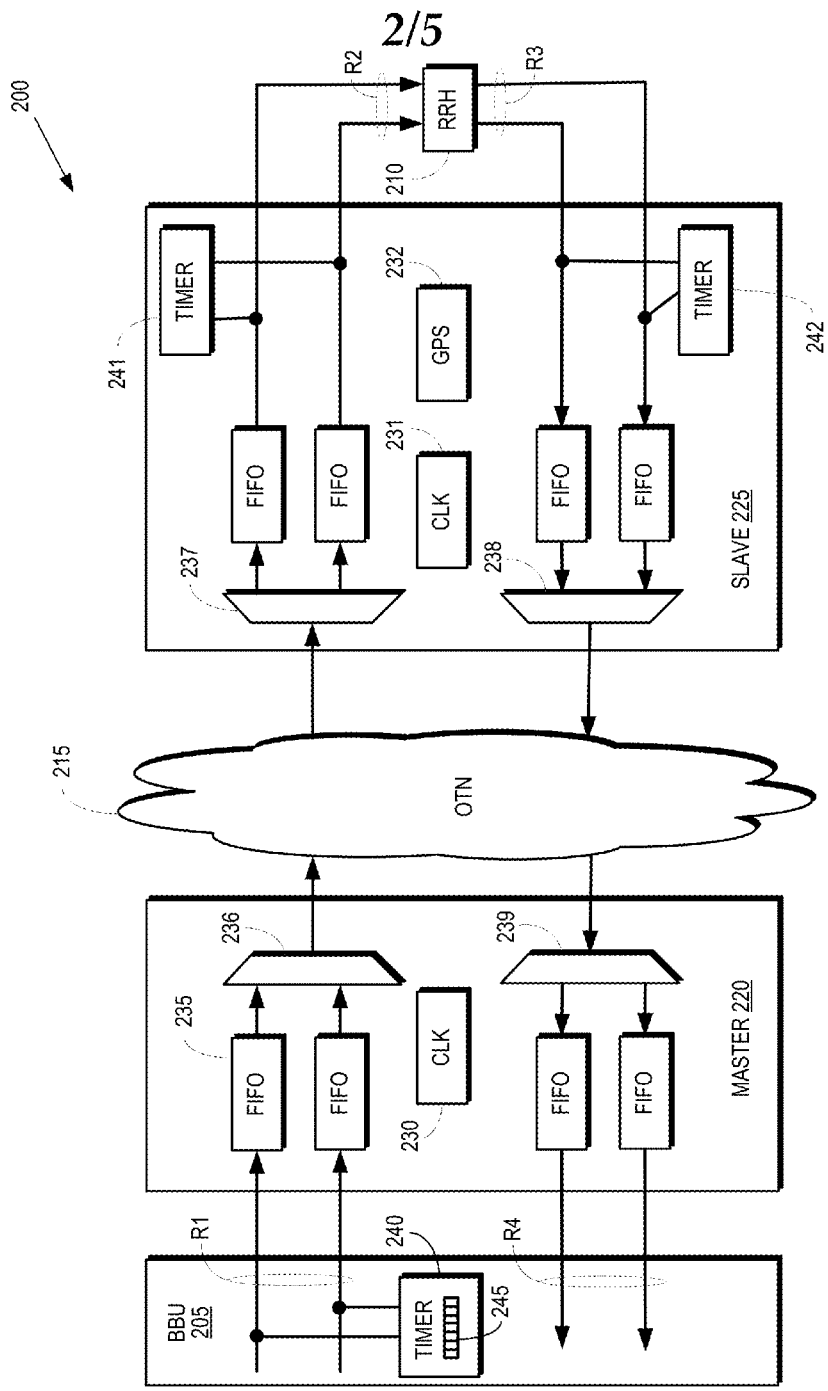
FIG. 2 is a block diagram of an eNodeB according to some embodiments.

FIG. 2 is a block diagram of an eNodeB 200 according to some embodiments. The eNodeB 200 may be used to implement some embodiments of the eNodeBs 101, 102 shown in FIG. 1. The eNodeB 200 includes a baseband unit 205 that communicates with a remote radio head 210 over an optical transport network 215. A master device 220 is deployed proximate the baseband unit 205 and is connected to the base band unit 205. A slave device 225 is deployed proximate the remote radio head 210 and is connected to the remote radio head 210. The master device 220 and the slave device 225 communicate by exchanging signals over the optical transport network 215.

The master device 220 includes a clock 230 that can be synchronized to timing of the baseband unit 205, which may be synchronized to an external timing reference such as a GPS clock, as discussed herein. The slave device 225 includes a clock 231 that can be synchronized to an external timing reference. For example, the slave device 225 may include a GPS receiver 232 that receives the external timing reference provided by the GPS clock. Timing may therefore be synchronized throughout the elements of the eNodeB 200 including the baseband unit 205, the master device 220, the optical transport network 215, and the slave device 225.

The eNodeB 200 may support multiple uplink (or transmission) paths or multiple downlink (or reception) paths. For example, the baseband unit 205 may provide signals to two downlink ports to the downlink path and receive signals via two uplink ports for the uplink path, as indicated by the two sets of rightward pointing arrows and the two sets of leftward pointing arrows, respectively. Some embodiments of the eNodeB 200 may include more or fewer downlink ports or uplink ports associated with more or fewer transmission paths or reception paths. Information in the frames transmitted from the baseband unit 205 to the master device 220 is provided to buffers such as a first-and-first-out (FIFO) buffer 235 (only one indicated by a reference numeral in the interest of clarity). Frames in the parallel downlink paths may be compressed or multiplexed together in a multiplexer 236 for transmission to the slave device 225 over the optical transport network 215. The frames received over the parallel downlink paths at the slave device 225 may be decompressed or demultiplexed in a demultiplexer 237 and provided to corresponding FIFOs before transmission to the remote radio head 210. Frames may be returned from the remote radio head 210 in parallel uplink paths that are provided to corresponding FIFOs before being compressed or multiplexed in the multiplexer 238 for transmission from the slave device 225 to the master device 220 over the optical transport network 215. The frames received over the parallel uplink paths at the master device 220 may be decompressed or demultiplexed in a demultiplexer 239 and provided to corresponding FIFOs before transmission to the baseband unit 205.

The baseband unit 205 and the slave device 225 include timers 240, 241, 242 (collectively referred to herein as "the timers 240-242") for measuring times corresponding to events occurring at corresponding nodes (indicated by black dots) in the transmission path or reception path. Some embodiments of the timers 240-242 are traceable to a clock or timing reference in the optical transport network 215 so that the timers 240-242 may be synchronized with the other timing references used in the eNodeB 200 with sufficient accuracy such as an accuracy of <50 ppb. The sub-second portions of the timers 240-242 may restart on the rising edge of an external timing reference such as a 1 Pulse Per Second (1PPS) pulse provided by a GPS receiver every second. One or more timers 240 in the baseband unit 205 include or are associated with one or more counters 245 that may be incremented to count the number of frames that pass the corresponding node. Some embodiments of the counters 245 may include a number of bits that is chosen to provide a predetermined measurement accuracy and duration. For example, the counters 245 may include 29 bits to cover a one second duration with a three nanosecond range resolution to provide high measurement accuracy.

The timers 240 in the baseband unit 205 generate a timestamp in response to the corresponding counters 245 indicating that the predetermined interval of frames has elapsed. Some embodiments of the timers 240 generate a timestamp in response to a set of least significant bits of the counters 245 wrapping to zero. For example, the timers 240 may generate a timestamp in response to the nine least significant bits of the corresponding counters 245 wrapping to zero. For another example, the timers 240 may generate a timestamp in response to the ten least significant bits of the corresponding counters 245 wrapping to zero. The baseband unit 205 incorporates values of the counters into the corresponding frames before providing the frames to the master device 220.

Some embodiments of the timers 241, 242 in the slave device 225 may then monitor the values of the counters in each passing frame to determine whether to generate a timestamp. For example, in response to detecting a value of the counter in a frame indicating that a predetermined interval of frames has elapsed, the timers 241, 242 may generate one timestamp for each of the two uplink paths and the two downlink paths between the remote radio head and the slave device 225. The timestamps generated by the timers 241, 242 and the corresponding frame number may then be transmitted to the baseband unit 205. A predetermined number of timestamps may be generated at successive time intervals. For example, a measurement may be taken every 5-10 seconds for 1000 measurements and the resulting timestamps and frame numbers may be provided to the baseband unit 205 over the optical transport network 215.

The baseband unit 205 may determine a round-trip time from the baseband unit 205 to the remote radio head 210 and back. The round-trip time may then be used with the timestamps provided by the timers 240-242 to independently determine the uplink delay and the downlink delay in the eNodeB 200. The time recorded by the timer 240 after a predetermined interval of frames may be represented as TS_T1, the time recorded by the timer 241 after the predetermined interval of frames may be represented as TS_BBSTX, and the time recorded by the timer 242 after the predetermined interval of frames may be represented as TS_BBSRX. The downlink egress point for the baseband unit 205 is indicated by R1, the downlink ingress point for the remote radio head 210 is indicated by R2, the uplink egress point for the remote radio head 210 is indicated by R3, and the uplink ingress point for the baseband unit 205 is indicated by R4. The round-trip delay determined by the baseband unit 205 from R1 to R4 may be represented as T14. The baseband unit 205 may calculate the downlink delay T12 from R1 to R2 as:

$$T12=TS\_BBSTX-TS\_T1+(TS\_BBSRX-TS\_BBSTX)/2$$

and the baseband unit 205 may calculate the uplink delay T34 from R3 to R4 as:

$$T34=T14-(TS\_BBSRX-TS\_T1)+(TS\_BBSRX-TS\_BBSTX)/2$$

Some embodiments of the baseband unit 205 may calculate the downlink delays T12 and the uplink delays T34 for a large number of successive intervals of frames (e.g., 1000 frame intervals) and then average the values to generate an average downlink delay and an average uplink delay. The average downlink delay and the average uplink delay may then be used to correct the timing of signals transmitted or received by the baseband unit 205 for delay errors introduced between the baseband unit 205 and the remote radio head 210.

Averaging of the uplink and downlink delays may reduce or eliminate errors in an external timing reference. For example, the GPS timing reference introduces jitter into the timing delay measurements at least in part because the 1PPS output of a GPS receiver has an error of approximately 25 ns with 1 sigma statistics. Thus, due to the GPS receiver's inherent accuracy specification, a single measurement of the uplink delay or downlink delay based on a snapshot of the 1PPS output can lead to errors that are large relative to the target delay error, e.g., errors that are large relative to a target delay error that is significantly less than 100 ns. In addition, the timers 240-242 may be restarted based on a jittered GPS receiver 1PPS pulse. Averaging over a large number of delay measurements spaced out over a long duration (e.g., 1 measurement per 5 to 10 sec for 1000 measurements) may reduce or remove the error produced by the jittered GPS receiver 1PPS pulse in the uplink delay or downlink delay measurements.

Some embodiments of the eNodeB 200 may reduce or eliminate errors in the external timing reference by refining an initial target delay error. For example, the baseband unit 205 may take snapshot of a delay measurement of the uplink delay or the downlink delay. The potential GPS receiver delay error may be in the 100 ns range (assuming 4 sigma statistics from the received GPS signals). The eNodeB 200 may then begin operation and initiate emergency service such as an e911 OTDOA application. During initiation of the e911 OTDOA application, the eNodeB 200 may allocate an additional 100 ns to the uplink delay budget or downlink delay budget so that the overall accuracy of the e911

OTDOA application is 200 ns, e.g., the original 100 ns budget plus the additional 100 ns for the inaccurate reporting of the uplink or downlink delays. In some embodiments, doubling of the degradation of the overall e911 accuracy from the original 30 m to 60 m by increasing the overall delay budget to 200 ns meets the FCC mandate to have 100 m accuracy, especially since OTDOA may only be a supplement technique to other techniques that are used in some embodiments.

The eNodeB 200 may begin collecting time measurements from the timers 240-242 and using the timing measurements to compute values of the uplink delay or the downlink delay. After a predetermined number of delay path measurements are collected, the eNodeB 200 computes an average of the uplink delays or the downlink delays. The average uplink delay or the average downlink delay may have a significantly higher accuracy than any of the individual measurements. In some embodiments, the average uplink delay or the average downlink delay may achieve 10 ns accuracy (due to miscellaneous errors) as the GPS receiver error is removed. Once the eNodeB 200 has started operation, the eNodeB 200 may not be able to perform another delay compensation calculation to adjust radio frame transmission alignment at the antenna tip without resetting the system. To take advantage of the more accurate delay measurement that is obtained after this long-term averaging of delay path measurements, the e911 OTDOA application may report this averaged delay to an e911 server such as the MLC 130 shown in FIG. 1, which may perform an e911 location calculation (e.g., triangulation or multilateration) with this small offset delay to remove the error.

Figure 3:
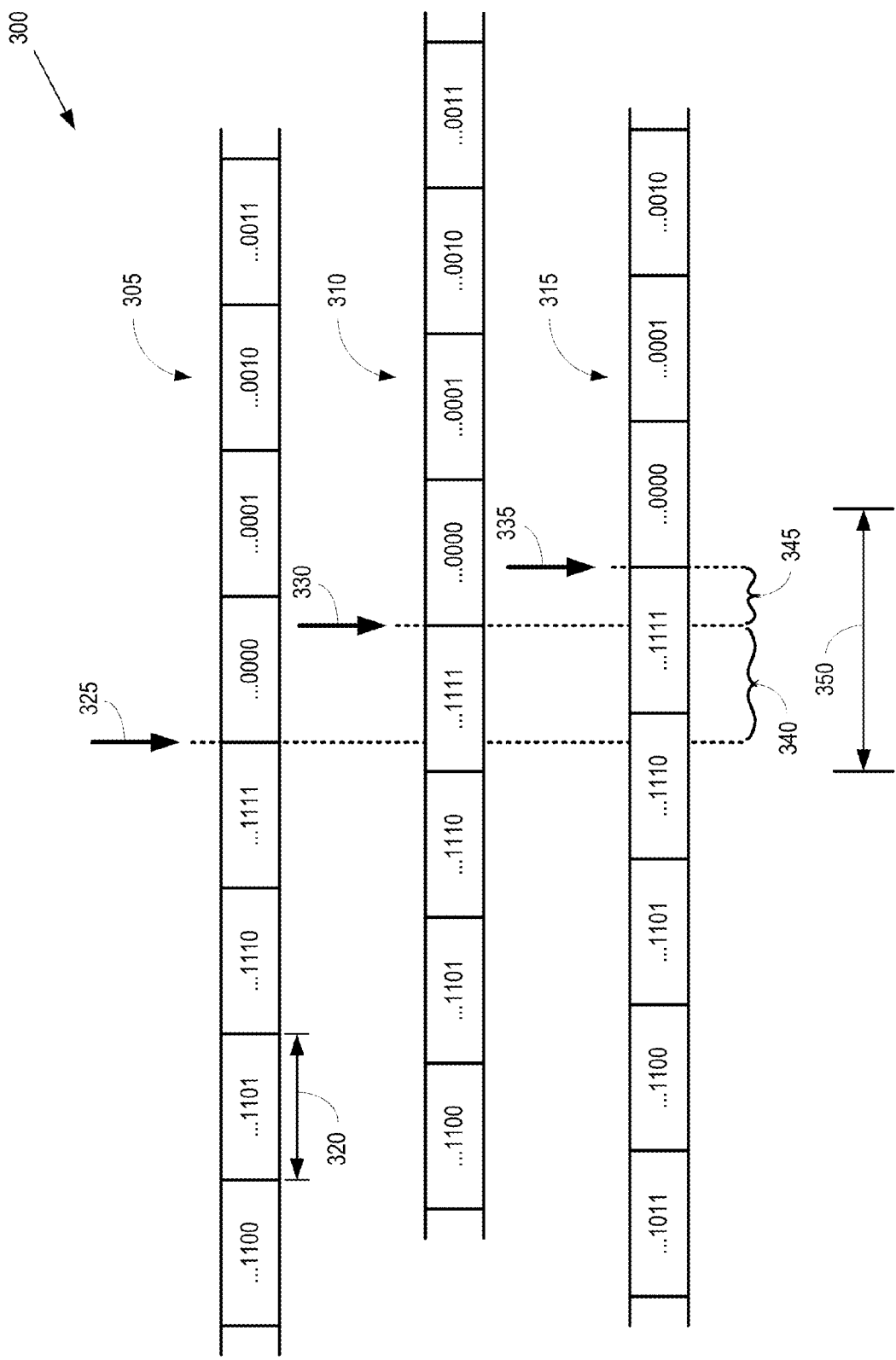
FIG. 3 is a diagram of a series of frames passing by timers in a baseband unit and a slave device associated with a remote radio head according to some embodiments.

FIG. 3 is a diagram of a series of frames passing by timers in a baseband unit and a slave device associated with the remote radio head according to some embodiments. The series 305 represents frames passing by a downlink node in a baseband unit such as the baseband unit 205 shown in FIG. 2. The series 310 represents frames passing by a downlink node in a slave device such as the slave device 225 shown in FIG. 2. The series 315 represents frames passing by an uplink node in the slave device such as the slave device 225 shown in FIG. 2. Each frame has a predetermined duration 320, e.g., each frame may have a duration 320 of 10 ms. The binary numbers shown within each frame represent the values of counters associated with the corresponding nodes. For example the binary numbers shown in the frames of the series 305, 310, 315 may represent the value of the counter 245 inserted into a predetermined location in the frames by the baseband unit 205 shown in FIG. 2.

Timers such as the timers 240-242 may make time measurements after an interval of frames. Some embodiments of the timers may make the time measurements after a set of least significant bits of a corresponding counter wrap to zero. For example, a timer in a baseband unit may make a time measurement in response to a value of the corresponding counter wrapping to zero, as indicated by the arrow 325, a timer associated with a downlink node in a slave device may make a time measurement in response to the corresponding counter wrapping to zero, as indicated by the arrow 330, and a timer associated with an uplink node in the slave device may make a time measurement in response to the corresponding counter wrapping to zero, as indicated by the arrow 335. The time difference 340 may represent the time that elapses as the series of frames travels from the baseband unit to the downlink node in the slave device. The time difference 345 may represent the time that elapses as the series of frames travels from the downlink node in the slave device to the uplink node in the slave device via a remote radio head. A round-trip time 350 may be used with the measured times to independently determine the uplink delays and downlink delays, as discussed herein.

Figure 4:
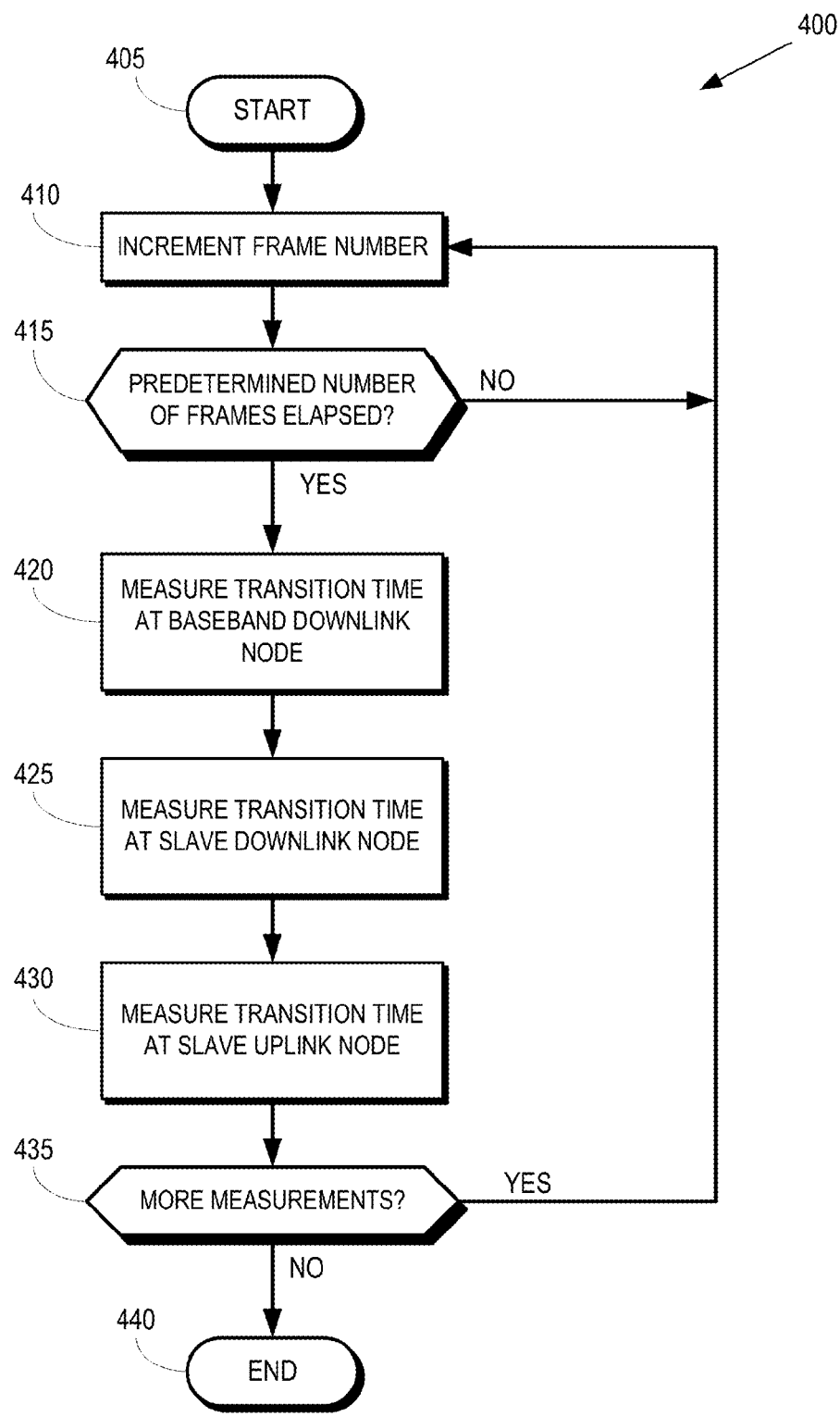
FIG. 4 is a flow diagram of a method of measuring transition times for a counter associated with a baseband unit according to some embodiments.

FIG. 4 is a flow diagram of a method 400 of measuring transition times for counters in a baseband unit and a slave device associated with a remote radio head according to some embodiments. The transition time indicates a time at which a value of a counter transitions to a particular value, e.g., to a time at which a portion of the least significant bits of the corresponding counter value wrap to zero. The method 400 may be implemented in embodiments of the eNodeB 200 shown in FIG. 2. The method 400 starts at block 405. At block 410, a frame number is incremented. For example, the counters in the baseband unit may be incremented each time the frame number is incremented. A value of the frame number may be inserted at a predetermined location within the frame. At decision block 415, it is determined whether a predetermined number of frames has elapsed. For example, timers may determine that the predetermined number of frames has elapsed when values of the counters in a frame wrap to zero. As long as the predetermined number of frames has not yet elapsed, the frame number continues to increment at block 410.

Time measurements may be performed in response to the predetermined number of frames elapsing. At block 420, a timer associated with a downlink node in the baseband unit (such as the timer 240 shown in FIG. 2) measures a transition time at which the corresponding counter (such as the counter 245 shown in FIG. 2) wraps to zero. At block 425, a timer associated with a downlink node in the slave device (such as the timer 241 shown in FIG. 2) measures a transition time at which the value of the corresponding counter indicated in the frame wraps to zero. At block 430, a timer associated with an uplink node in the slave device (such as the timer 243 shown in FIG. 2) measures a transition time at which the value of the corresponding counter indicated in the frame wraps to zero. The measured times and the corresponding frame numbers may be provided to the baseband unit. At decision block 435, the eNodeB determines whether there are more measurements to be taken. If so, the method 400 is iterated. If not, the method 400 ends at block 440.

Figure 5:
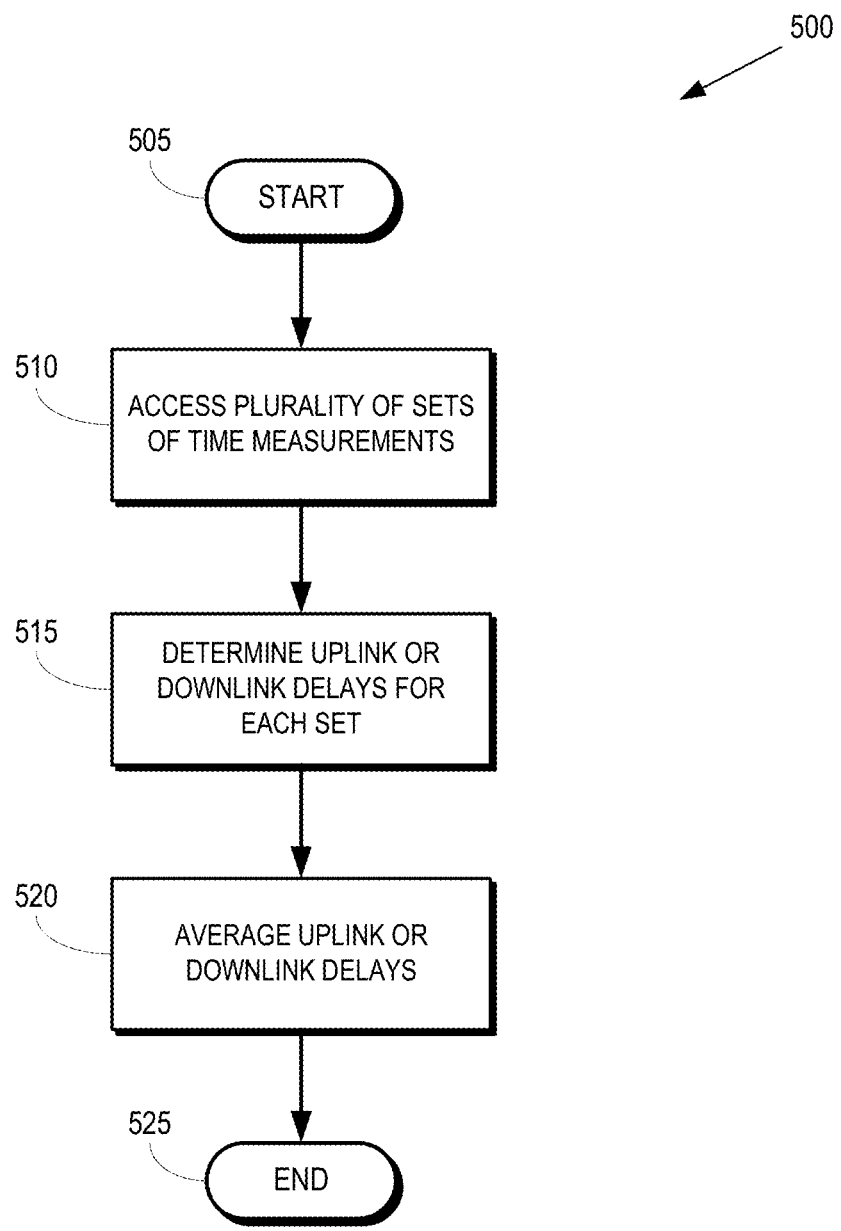
FIG. 5 is a flow diagram of a method of independently determining average uplink delays or average downlink delays according to some embodiments.

FIG. 5 is a flow diagram of a method 500 of independently determining average uplink delays or average downlink delay support to some embodiments. The method 500 may be implemented in some embodiments of the eNodeB 200 shown in FIG. 2. The method 500 starts at block 505. At block 510, a baseband unit in the eNodeB accesses a plurality of sets of time measurements provided by timers in the baseband unit and a slave device, as discussed herein. At block 515, the baseband unit determines an uplink delay or downlink delay for each set of time measurements. At block 520, the baseband unit averages the uplink delays for the downlink delays to generate an average uplink delay or an average downlink delay that characterizes the eNodeB. The average uplink delay or average downlink delay may be used to correct the timing of signals transmitted or received by the eNodeB, as discussed herein. The method 500 ends at block 525.

Some embodiments of the apparatuses or techniques described above may be implemented using field-programmable gate arrays (FPGAs). An FPGA may include logic gates and memory blocks that can be configured to implement embodiments of devices such as the baseband unit 205, the master 220, or the slave 225 shown in FIG. 2. The FPGA design may be specified using a hardware description language (HDL) that indicates how programmable logic blocks in the FPGA are to be connected using reconfigurable interconnects.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A non-transitory computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    determining a first time at a downlink node associated with a baseband unit after an interval of frames;
    determining a second time at a downlink node associated with a remote radio head after the interval of frames;
    determining a third time at an uplink node associated with the remote radio head after the interval of frames; and
    determining, at the baseband unit, at least one of an uplink delay and a downlink delay for frames transmitted between the baseband unit and the remote radio head based on the first time, the second time, the third time, and a round-trip time between the baseband unit and the remote radio head.

2. The method of claim 1, further comprising:
    inserting values of a counter at a predetermined location in at least some of the frames; wherein the counter is incremented prior to insertion into the frames, and comprising determining the first time, the second time, and the third time in response to the value of the counter wrapping to zero.

3. The method of claim 1, wherein determining at least one of the uplink delay and the downlink delay comprises determining a plurality of uplink delays and a plurality of downlink delays, wherein at least one of the determined uplink delays or downlink delays is determined using times determined in response to the interval of frames elapsing following one or more previous time determinations.

4. The method of claim 3, further comprising:
    determining at least one of an average uplink delay and an average downlink delay by averaging at least some of the plurality of uplink delays or averaging at least some of the plurality of downlink delays.

5. The method of claim 1, further comprising:
    determining a location of user equipment based on at least one of the uplink delay and the downlink delay.

6. An apparatus comprising:
    a first timer to determine a first time at a downlink node in a baseband unit after an interval of frames;
    a second timer to determine a second time at a downlink node in a slave device associated with a remote radio head after the interval of frames;
    a third timer to determine a third time at an uplink node in the slave device associated with the remote radio head after the interval of frames; and
    a baseband unit to determine at least one of an uplink delay and a downlink delay for frames transmitted between the baseband unit and the remote radio head based on the first time, the second time, the third time, and a round-trip time between the baseband unit and the remote radio head.

7. The apparatus of claim 6, wherein the baseband unit comprises a counter that is incremented for at least some of the frames, and wherein the baseband unit inserts values of the counter at a predetermined location in the frames; and wherein the first timer determines the first time in response to a set of least significant bits of the counter wrapping to zero after the interval of frames, and wherein the second timer determines the second time in response to the set of least significant bits of the value of the counter wrapping to zero after the interval of frames, and the third timer determines the third time in response to the set of least significant bits of the value of the counter wrapping to zero after the interval of frames.

8. The apparatus of claim 6, wherein the baseband unit determines a plurality of uplink delays and a plurality of downlink delays, wherein at least one of the uplink delays or downlink delays is determined using times determined in response to the interval of frames elapsing following one or more previous time determinations.

9. The apparatus of claim 8, wherein the baseband unit determines at least one of an average uplink delay and an average downlink delay by averaging at least some of the plurality of uplink delays or averaging at least some of the plurality of downlink delays.

10. The apparatus of claim 6, wherein the baseband unit determines at least one location of user equipment based on at least one of the uplink delay and the downlink delay.

11. A non-transitory computer readable medium embodying a set of executable instructions, the set of executable instructions to configure at least one processor to:
determine a first time at a downlink node associated with a baseband unit after an interval of frames;
determine a second time at a downlink node associated with a remote radio head after the interval of frames;
determine a third time at an uplink node associated with the remote radio head after the interval of frames; and
determine at least one of an uplink delay and a downlink delay for signals transmitted between the baseband unit and the remote radio head based on the first time, the second time, the third time, and a round-trip time between the baseband unit and the remote radio head.

12. The non-transitory computer readable medium of claim 11, wherein the set of executable instructions is to further configure the at least one processor to:
determine the uplink delay to be equal to the round-trip time minus a difference between the first time and the third time.

13. The non-transitory computer readable medium of claim 11, wherein the set of executable instructions is to further configure the at least one processor to:
determine the downlink delay to be equal to a difference between the first time and the second time.

14. The non-transitory computer readable medium of claim 11, wherein the set of executable instructions is to manipulate the at least one processor to:
determine at least one of an average uplink delay and an average downlink delay by averaging at least some of a determined plurality of uplink delays or averaging at least some of a determined plurality of downlink delays; and
determine at least one location of user equipment based on at least one of the average uplink delay and the average downlink delay.

* * * * *